United States Patent [19]

Rumreich

[11] Patent Number: 4,660,087

[45] Date of Patent: Apr. 21, 1987

[54] VIDEO SIGNAL PROCESSING SYSTEM WITH OFFSET SOUND TRAP

[75] Inventor: Mark F. Rumreich, Indianapolis, Ind.

[73] Assignee: RCA Corporation, Princeton, N.J.

[21] Appl. No.: 834,911

[22] Filed: Feb. 28, 1986

[51] Int. Cl.$^4$ .............................................. H04N 5/62
[52] U.S. Cl. .................................... 358/197; 358/196
[58] Field of Search ............ 358/196, 197, 198, 195.1, 358/191.1

[56] References Cited

U.S. PATENT DOCUMENTS

| | | | |
|---|---|---|---|
| 4,490,743 | 12/1984 | Mycynei | 358/197 |
| 4,551,756 | 11/1985 | Ogawa | 358/197 |
| 4,562,472 | 11/1985 | Carlson | 358/197 |
| 4,602,287 | 7/1986 | Fockens | 358/197 |

OTHER PUBLICATIONS

Technical data sheet for Sanyo SAW filter type TSB 2201.

Primary Examiner—Tommy P. Chin
Attorney, Agent, or Firm—P. J. Rasmussen; P. M. Emanuel; R. H. Kurdyla

[57] ABSTRACT

A first sound filter in a video IF channel of a television receiver exhibits a null response at a frequency slightly less than the 41.25 MHz sound IF carrier signal frequency. A demodulated baseband video signal is filtered by a second sound filter which exhibits a null response at a frequency slightly less than the 4.5 MHz intercarrier sound frequency. The first sound filter provides a nominal amount of attenuation of the sound carrier signal in the video IF channel, while conserving high frequency information as ultimately manifested in the demodulated baseband video signal. The second sound filter assists the first sound filter to assure that sound information is adequately attenuated in the baseband video signal.

3 Claims, 3 Drawing Figures

VIDEO SIGNAL PROCESSING SYSTEM WITH OFFSET SOUND TRAP

This invention concerns a video signal processing system, such as a television receiver, with a sound trap in a video IF signal channel and a sound trap in a demodulated baseband video signal path.

In a television receiver, the IF signal from a tuner of the receiver is filtered by an intermediate frequency (IF) channel prior to being demodulated into constituent video and sound components of the television signal. In one type of IF channel, sometimes called "quasi-parallel" IF, the sound and video signal components of the IF signal are separately filtered in separate channels prior to demodulation. In the sound IF channel the video IF carrier signal is mixed with the sound IF carrier signal to form a 4.5 MHz intercarrier sound signal which is subsequently demodulated to produce an audio signal. The video IF channel typically includes a trap for attenuating the 41.25 MHz sound carrier signal frequency. An output of the video IF channel is applied to a video demodulator which provides a baseband video signal. The baseband video signal is coupled to luminance and chrominance signal processing circuits in the case of a color television receiver.

A surface acoustic wave (SAW) filter when used in the IF channel of a television receiver offers advantages in terms of small size, low cost and reproducible performance without need of alignment. SAW filters are available as dual channel devices, i.e., including both video IF and sound IF SAW filter channels, and as such are particularly useful in receivers employing the quasi-parallel IF principle. One example of a dual channel SAW IF filter is SAW filter type TSB 2201 commercially available from Sanyo Corporation.

A SAW filter in the video IF channel typically exhibits a trap response, i.e., a frequency null, at the 41.25 MHz sound carrier frequency. The SAW filter sound trap commonly attenuates the 41.25 MHz sound carrier signal by approximately −25 db to −35 db, which is usually inadequate to assure that sound information will not interfere with or impair the video information contained in a demodulated baseband video signal. The sound information can be further attenuated in the video channel by means of a relatively simple and inexpensive 4.5 MHz trap in the baseband video signal path which attenuates an undesired 4.5 MHz sound intercarrier component produced as a result of the video signal demodulation process. The two traps produce an overall attenuation of sound information in the video channel of −50 db or more.

The amplitude versus frequency response of the sound trap in the video IF channel is typically non-ideal, since to produce an ideal trap response with extremely steep (approximately vertical) skirts in the band rejection region and a flat-topped characteristic in the passband region would require the use of a complex and costly IF filter. Applicant has recognized that the non-ideal response of the sound trap in the video IF channel produces unwanted attenuation of IF frequencies in the immediate vicinity of 41.75 MHz, and that such attenuation leads to associated attenuation of high frequency baseband video signal information particularly in the vicinity of the 4.08 MHz baseband chrominance signal. Unwanted attenuation of the luminance signal near 4 MHz also results.

Accordingly, pursuant to the principles of the present invention there is disclosed herein the combination of a sound trap in a video IF channel with a sound trap in a baseband video signal path, arranged to produce less attenuation of high frequency baseband video signal information while providing effective sound signal trapping in the video channel. In an illustrated preferred embodiment of the invention, a first sound filter in a video IF channel of a television receiver exhibits a null response at a frequency offset from the 41.25 MHz sound IF carrier signal frequency. A demodulated baseband video signal is filtered by a second sound filter which exhibits a null response at a frequency offset from the 4.5 MHz intercarrier sound frequency. The first sound filter provides a nominal amount of attenuation of the sound carrier signal in the video IF channel, while conserving high frequency information as ultimately manifested in the demodulated baseband video signal. The second sound filter assists the first sound filter to assure that sound information is adequately attenuated in the baseband video signal.

Figure 1:
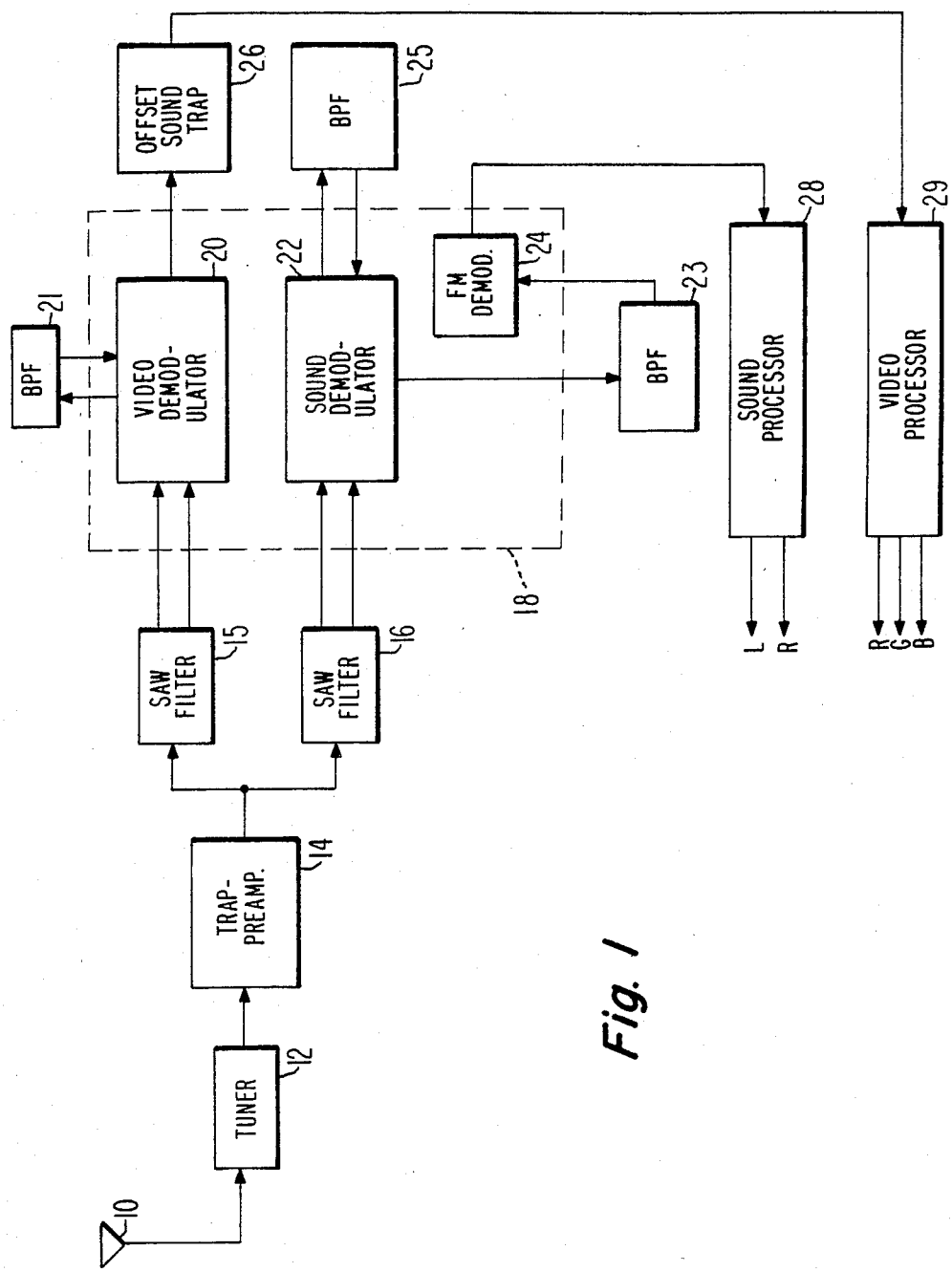
FIG. 1 shows a portion of a color television receiver system including apparatus in accordance with the principles of the present invention.

In FIG. 1, broadcast RF television signals received by an antenna 10 are applied to a tuner 12. Tuner 12 translates the RF signal of a selected TV channel to an intermediate frequency (IF) signal including video (picture) and sound carriers at, e.g., 45.75 MHz and 41.25 MHz, respectively, in the NTSC system. The video IF carrier is an amplitude modulated (AM) vestigial sideband signal containing the composite video information. The sound IF carrier is a frequency modulated (FM) signal.

The IF output signal from tuner 12 is applied to a network 14 including a preamplifier and a 47.25 MHz adjacent channel sound trap which prevents automatic fine tuning (AFT) circuits of the receiver (not shown) from locking onto the adjacent channel sound carrier signal rather than the carrier signal to which the receiver is tuned.

The IF signal from the output of network 14 is split into two separate channels for separate sound and video information processing in accordance with the quasi-parallel principle by applying it to two bandpass filters 15 and 16. The output signal from network 14 is applied to filter 15 in a video signal demodulation channel, and to filter 16 in a sound signal demodulation channel. Filters 15 and 16 in this example are of the surface acoustic wave (SAW) type.

Figure 2:
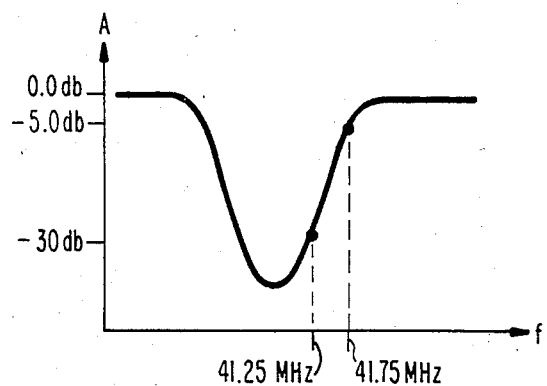
FIG. 2 illustrates the amplitude versus frequency response of a sound carrier trap included in a video IF channel in the system of FIG. 1.

Filter 15 has a video IF passband response which attenuates the 41.25 MHz sound carrier signal as shown by FIG. 2 which will be discussed subsequently. A differential output signal from filter 15 is applied to differential inputs of a video demodulator network 20 which in this example is included in an integrated circuit 18 such as type T2899 manufactured by Toshiba Corporation. A bandpass filter tank circuit 21 operatively associated with video demodulator 20 is tuned to the 45.75 MHz video carrier frequency. Demodulator 20 includes circuits which, in conjunction with bandpass filter 21, form a synchronous detector that produces an output baseband video signal. After filtering by a band reject sound trap 26 as will be discussed subsequently, the baseband video signal is applied to video signal processing circuits in a video processor 29 for producing R, G and B color image representative signals as known.

In most receivers sound trap 26 is a 4.5 MHz intercarrier sound trap for removing the intercarrier sound signal, which undesirably is produced by the video signal demodulation (mixing) process, from the baseband video signal to be processed by video processor 29. If the FM modulated 4.5 MHz intercarrier sound signal were permitted to be processed by video processor 29, annoying visible "beats" would be seen in a displayed picture as a result of interference between the intercarrier sound signal and the luminance and chrominance components of a baseband video signal.

Filter 16 in the sound IF channel exhibits a double tuned response with a first peak amplitude response at the 41.25 MHz sound carrier frequency, and a second peak amplitude response at the 45.75 MHz video carrier frequency. Alternatively, the first and second peak amplitude responses may exhibit a nonsymmetrical offset characteristic as explained in a copending U.S. patent application Ser. No. 790,458 of G. G. Tamer and D. E. Hollinden titled "Television Sound Signal Processor."

A differential output signal from filter 16 is applied to differential inputs of a sound demodulator network 22 also included in integrated circuit 18. A bandpass filter tank circuit 25 operatively associated with sound demodulator 22 is tuned to the 41.25 MHz sound carrier frequency. Demodulator 22 includes circuits which, in conjunction with bandpass filter 25, form a mixer for providing a 4.5 MHz FM intercarrier sound signal from the sound and video carriers. A bandpass filter 23, having a substantially symmetrical amplitude characteristic with respect to the 4.5 MHz center frequency of the intercarrier signal, couples the 4.5 MHz FM intercarrier sound signal from the output of demodulator 22 to an FM demodulator 24. A demodulated baseband audio signal from the output of FM demodulator 24 is applied to a sound signal processor network 28 which includes, for example, a stereo decoder which provides L (left) and R (right) baseband audio signals to audio amplifiers (not shown).

The amplitude versus frequency response of a video IF SAW filter used in a consumer television receiver corresponding to SAW filter 15 typically exhibits a nominal amount of attenuation at the 41.25 MHz sound carrier signal frequency, and unwanted attenuation of IF frequencies in the vicinity of 41.75 MHz. To achieve a SAW filter response with a nominal amount of attenuation at 41.25 MHz but with insignificant or zero attenuation at 41.75 MHz would require the use of a relatively large and expensive SAW filter. Such a SAW filter would be uneconomical for use in a consumer television receiver, however.

SAW filter 15 in the video IF channel of the embodiment of the present invention exhibits a trap response as depicted by the amplitude (A) versus frequency (f) response of FIG. 2. Specifically, a frequency null exists at a frequency (e.g., approximately 41 MHz) slightly less than the 41.25 MHz frequency of the sound carrier signal. The 41.25 MHz sound carrier is therefore subjected to less attenuation than would have been experienced if the sound carrier frequency were situated at the null point. At the same time, however, IF signal frequencies in the immediate vicinity of 41.75 MHz are advantageously subjected to less attenuation. This result is desirable since such IF frequencies are associated with frequencies in the vicinity of the 4.08 MHz chrominance signal component of a demodulated baseband video signal, and with high frequency luminance signal components of a baseband video signal.

Thus although the described sound trap frequency response of SAW filter 15 results in less attenuation of the undesired 41.25 MHz IF sound carrier signal in the video IF channel, signal frequencies in the vicinity of 41.75 MHz are desirably attenuated less. In this example the 41.75 MHz signal frequency (corresponding to 4.0 MHz in a baseband video signal) is attenuated by approximately −5 db, which is several db less attenuation than would be experienced if SAW filter 15 exhibited a null at the 41.25 MHz sound carrier signal frequency. As a result of the described trap response of filter 15, excessive attenuation of baseband chrominance signal information and high frequency luminance signal information is avoided.

Figure 3:
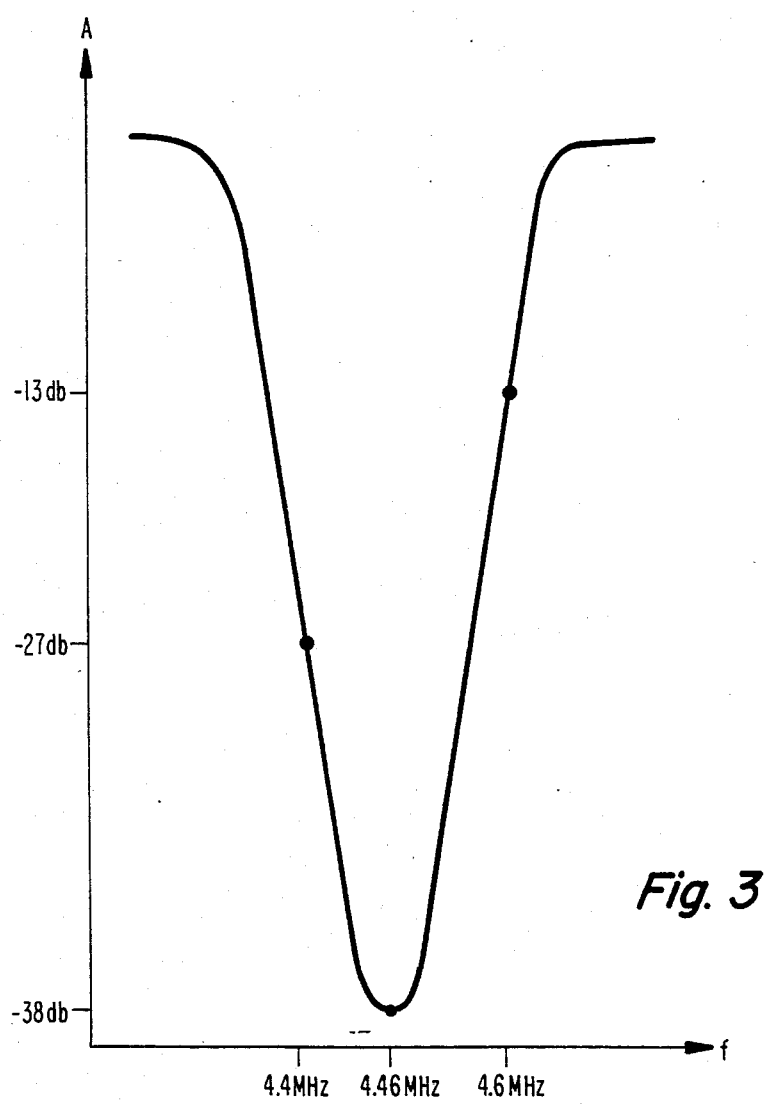
FIG. 3 illustrates the amplitude versus frequency response of a sound trap in a baseband video signal path in the system of FIG. 1.

The reduced attenuation of the 41.25 MHz sound carrier frequency which results from the described trap response of filter 15 is compensated for by means of offset sound trap 26, which filters the demodulated baseband video signal provided from video demodulator 20. Offset trap 26 illustratively comprises a relatively simple and inexpensive tank circuit or ceramic filter with a null frequency of 4.46 MHz, which is slightly offset from the 4.5 MHz intercarrier sound signal frequency. Offset trap 26 provides the additional attenuation needed to assure that sound components are sufficiently attenuated in the baseband video signal applied to video processor 29. The sound trapping characteristics of filter 15 and trap 26 produce a desired amount of sound information attenuation (approximately −50 db) in the video channel, with an overall baseband video channel sound trapping response which is substantially symmetrical around 4.5 MHz. Such symmetrical response is dictated by the normally expected symmetrical energy distribution of sound information and results from the combined offset amplitude versus frequency characteristics illustrated by FIGS. 2 and 3.

Thus the disclosed combination of filter 15 in the video IF channel having a null at a frequency slightly offset from the 41.25 MHz sound carrier frequency, with a trap 26 in the baseband video path having a null slightly offset from the 4.5 MHz intercarrier sound frequency, produces a desired amount of sound information attenuation in the video channel while also conserving high frequency baseband video information associated with the chrominance and luminance components.

What is claimed is:

1. In a video signal processing system having a video IF signal processing channel, means for demodulating a video IF output signal from said video IF signal processing channel to produce a baseband video signal, and a video signal path for coupling said baseband video signal to video signal utilization means, apparatus comprising:

a first filter in said video IF signal processing channel exhibiting a null response at a frequency offset from the frequency of an IF sound carrier signal; and a second filter in said video signal path exhibiting a null response at a frequency offset from the frequency of an intercarrier sound signal.

2. Apparatus according to claim 1, wherein
said first filter exhibits a null response at a frequency less than the frequency of said IF sound carrier signal; and
said second filter exhibits a null response at a frequency less than the frequency of said intercarrier sound signal.

3. Apparatus according to claim 2, wherein
said video signal processing system comprises a quasi-parallel IF signal processing network including said video IF signal processing channel and a sound IF signal processing channel; and
said first filter is a surface acoustic wave (SAW) filter.

* * * * *